United States Patent [19]
Makofka et al.

[11] 4,151,961
[45] May 1, 1979

[54] HAY PROCESSING MACHINE

[75] Inventors: Stanley J. Makofka; Shaun A. Seymour, both of New Holland, Pa.

[73] Assignee: Sperry Rand Corporation, New Holland, Pa.

[21] Appl. No.: 861,794

[22] Filed: Dec. 19, 1977

Related U.S. Application Data

[63] Continuation of Ser. No. 757,419, Jan. 6, 1977, abandoned.

[51] Int. Cl.$^2$ .................... B02C 18/22; B02C 21/02
[52] U.S. Cl. .................... 241/101 A; 171/63; 241/101.7; 241/186 R; 414/685
[58] Field of Search ............ 214/101A, 101.7, 186 R, 214/222, 280; 214/38 BA, 77 R, 78, 85; 171/63; 56/16.1

[56] References Cited

U.S. PATENT DOCUMENTS

| | | | |
|---|---|---|---|
| 2,489,869 | 11/1949 | Dunn | 214/38 BA |
| 3,356,158 | 12/1967 | Deaver et al. | 171/63 |
| 3,972,484 | 8/1976 | Ryan | 241/101 A X |
| 3,979,074 | 9/1976 | White et al. | 241/101.7 X |
| 3,999,674 | 12/1976 | Meitz | 241/101 A |

Primary Examiner—Howard N. Goldberg
Attorney, Agent, or Firm—Ralph D'Alessandro; Frank A. Seemar; John B. Mitchell

[57] ABSTRACT

A mobile processing machine for shredding a package of forage material such as a large cylindrical bale comprising a planar elevating member pivotally supported adjacent one edge in a frame and operated by hydraulic cylinder units from the under-surface to elevate the leading edge upwardly and having slidably related plate mechanism to prevent passage of said products at the pivoted area of said member and also provide a downwardly and inwardly directed surface for a bale of said products to urge the same against a pair of rotatable shredding members which direct the shredded product material to an auger for discharge from one end of the machine.

2 Claims, 4 Drawing Figures

HAY PROCESSING MACHINE

This is a continuation of application Ser. No. 757,419, filed Jan. 6, 1977, now abandoned.

BACKGROUND OF THE INVENTION

For a long period of time, it was customary to harvest forage crop material, such as hay and the like, by mowing the same, arranging it in windrows, and then processing the same by means of a baling machine in which the windrows were arranged in flat, accordian configuration and compressed into a rectangular bale around which one or more tying strands were disposed to secure the bales in the desired configuration. Bales of this type normally were stored in a suitable enclosure such as a shed or barn, while under some circumstances, stacks of the bales were left in the field but covered by waterproof sheeting of some type.

In more recent years, it has been found feasible to continuously pick up a swath or windrow of forage crop material, such as hay, and arrange the same into a compact coil of substantial size comprising a roll type bale. Such bales are commonly of the order of four or five feet in diameter and may be approximately five or six feet or more in length. One advantage of such bales is that when left in a field in which feeding of live stock occurred, the bale could rest directly upon the ground with the axis thereof parallel to the ground and, due to the cylindrical nature of the bale, and particularly in view of the fact that the strands of the hay comprising the bale are arranged substantially in circumferential manner, the upper portion of such a bale readily sheds rain and other inclement weather products, whereby it is not necessary to store bales of this type in any type of building affording a cover for the same unless such type of storage is desired.

Incident to forming crop material of this type into roll type bales, it has been found that under certain circumstances, mostly undesired, said bales are very dense and compact and, in particular, it is not possible for any substantial number of cattle to feed upon a single bale at any one time. Further, if a bale of this type is too compact, it is difficult for cattle and other livestock to effectively feed upon the bale due to the tightness of the fibers of the material therein.

In an effort to obviate the foregoing difficulty and particularly to provide means to shred the contents of such a bale and especially to dispose the same in feed containers or directly upon the ground in feed lots so that cattle and other livestock readily could consume the material, a method and apparatus for processing roll type bale comprises the subject matter of U.S. Pat. No. 3,979,074, dated Sept. 7, 1976, in the name of White et al. While the machine comprising the subject matter of said patent has certain attributes and is capable of effecting shredding or disintegrating of roll type bales, it has been found that certain improvements over said machine are possible and the present invention comprises a number of such improvements which are described in detail hereinafter and are illustrated in the accompanying drawings comprising part of the application.

SUMMARY OF THE INVENTION

It is one of the principal objects of the present invention to provide in a processing machine for shredding forage material packages having preferably a mobile frame which supports rotatable shredding members operable upon horizontal axes and having tooth means which aggressively engage the surface material on such forage packages and shred the same incident to the package being elevated by a preferably planar and imperforate elevating member from an initial loading position, in which the member extends downwardly and forwardly to engage said package, to an operative position in which, at maximum elevation, the elevating member extends downwardly and inward relative to the rotatable shredding member so as to afford a smooth surface along which the forage package is urged by gravity into engagement with the rotatable shredding members.

It is another object of the invention to provide in the frame an auger type discharge member which is in the lower and rearward portion of the frame to receive shredded material from the rotatable shredding members, the auger member having a shell extending around at least the lower portion thereof and that part of said shell which is farthest from the rear end of the machine extends forwardly and upwardly to form a rigid, partial floor which at least partially overlies the pivot means for the elevating member, and additional auxiliary floor means extend between said partial floor member and said elevating member to prevent material from escaping unintentionally from the machine except from one end of the auger member as intended.

A further object of the invention is to provide said auxiliary floor means in the form of a plate pivotally connected along one edge to the forward edge of said partial floor member and the opposite edges of said plate slidably engages the upper surface of the elevating member while moving between the opposite extreme positions thereof.

Still another object of the invention is to arrange said auxiliary floor plate so that it is suspended by a hinge from the partial floor member but the length of said plate relative to the path of movement of the elevating member is sufficient that the auxiliary floor plate is always at an obtuse angle to the upper surface of said elevating member.

A still further object of the invention is to arrange said auxiliary floor plate so that it is substantially within the plane of the edge of the partial floor member to which it is connected pivotally when the elevated member is in or close to its maximum elevated position, whereby the under surface of the auxiliary floor plate also is at an acute angle to said elevating member under such circumstances in order that an overall, inward and downwardly extending surface is provided to feed a forage material package by gravity against said shredding means in said machine.

Details of the foregoing objects and of the invention, as well as other objects thereof, are set forth in the following specification and illustrated in the accompanying drawings comprising a part thereof.

DETAILED DESCRIPTON

Figure 1:
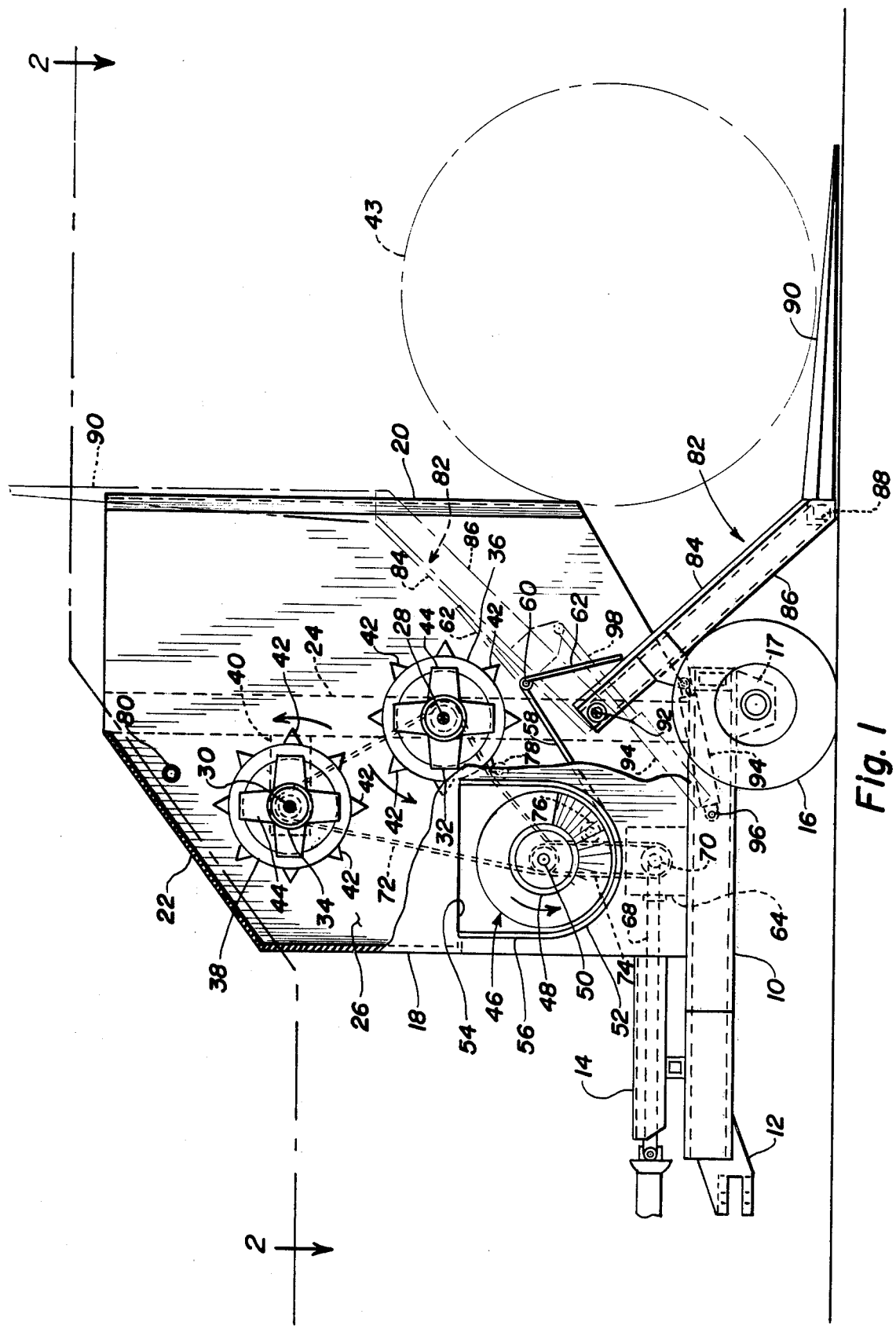
FIG. 1 is a side elevation, partly in vertical section, as seen along the line 1—1 in FIG. 3, and showing the principal elements of the hay processing machine comprising the present invention.

Referring particularly to FIG. 1, the hay processing machine comprising the present invention includes a mobile frame 10 having a tongue 12 on the forward end thereof for connection to a tractor which preferably is provided with a power takeoff in order that the p.t.o. connector 14 which is supported by frame 10 may be connected to the power takeoff of the tractor for purposes of furnishing power to bale elevating means, bale shredding means, and a delivery auger, details of which are described hereinafter.

Figures 3, 4:
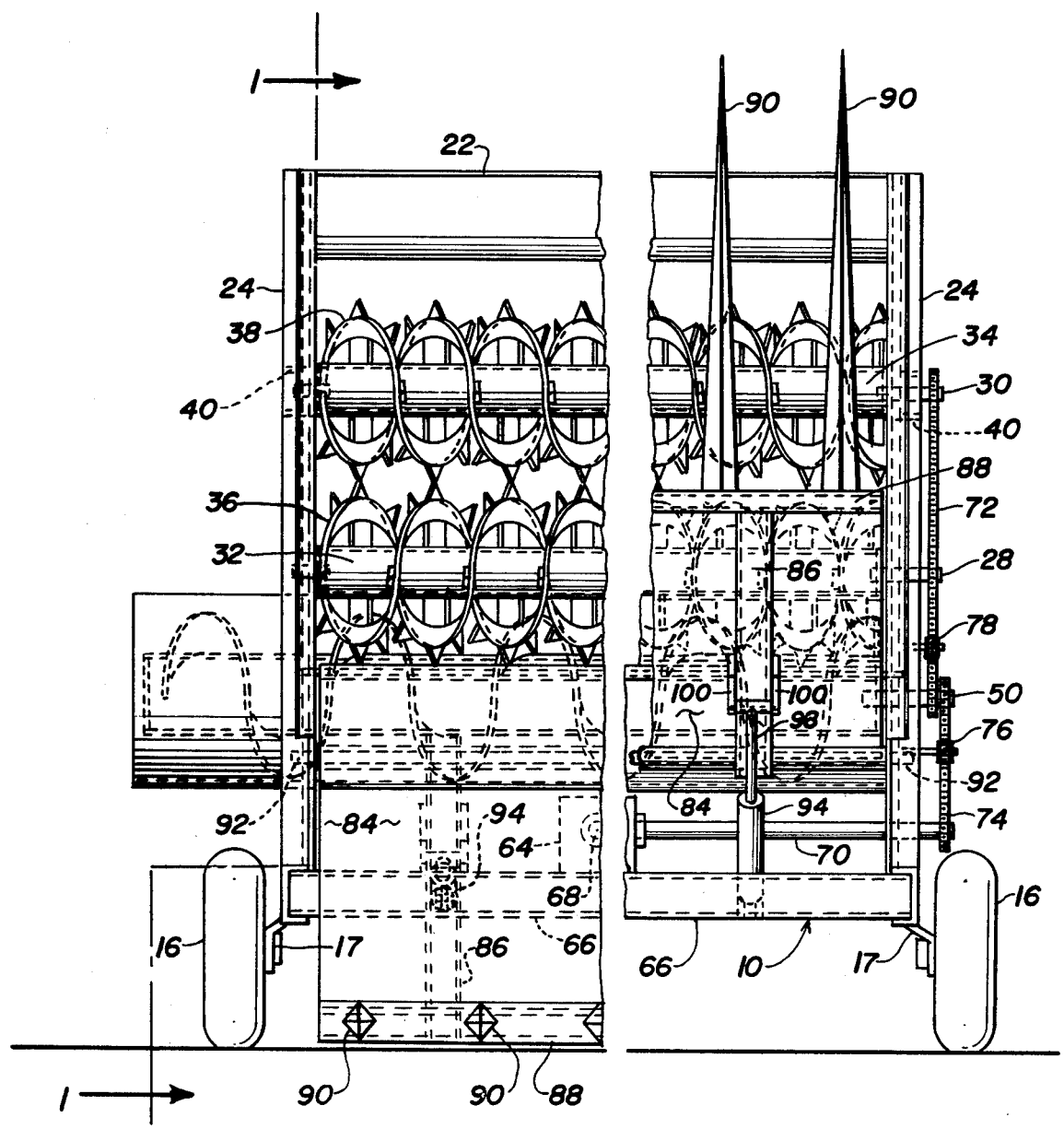
FIG. 3 is a fragmentary view showing the left hand side portion of the machine as viewed from the front end thereof with the bale elevating member in the lower position thereof as shown in full lines in FIG. 1.
FIG. 4 is a view similar to FIG. 3 but showing the right hand end portion of the machine and illustrating the bale elevating member in the uppermost, raised position thereof as shown in phantom in FIG. 1.

The opposite sides of the frame 10 support mobile wheels 16 supported by appropriate brackets 17 shown in FIGS. 3 and 4. The frame 10 supports a housing 18 which is closed at the back end of the machine but is open at the front end 20 thereof. The top of the housing 18 is also partially closed by an upward and forwardly sloping plate 22.

The frame 10 also has a pair of vertical frame members 24 respectively at opposite sides of the machine as shown in the figures which, in addition to furnishing firm support for the opposite side plates 26 of housing 18, primarily furnish support for opposite ends of the shafts 28 and 30, see FIG. 1, said shafts being short and secured to the tubular cores 32 and 34 respectively of the shredding members 36 and 38. The vertical frame members 24, adjacent the upper end thereof, respectively support short, rearwardly extending arms 40 which have bearings adjacent the rearward ends thereof within which the short shafts 30 of the uppermost shredding member 38 are supported. Similarily, suitable bearings are provided in the vertical frame members 24 which receive the short shafts 28 of the lower shredding member 36. The directions in which the shredding members 36 and 38 rotate respectively are shown by direction arrows in FIG. 1, said rotation being in the same direction. Also, as seen best from FIG. 1, the shredding members comprise helical strip members upon which shredding teeth 42 are rigidly connected in substantial numbers to assure positive and substantial shredding of a forage package such as the roll type bale 43, illustrated in phantom in FIG. 1. It should be noted here, that the principles of the present invention are not limited to a machine for processing roll type bales, but are equally applicable to a machine for processing other type forage packages, such as square bales, loose bundles, stacks, etc. Preferably, the helical strip members are supported by a plurality of spider members 44, best shown in FIG. 1, which extend radially from the central cores 32 and 34 of the shredding members 36 and 38.

Figure 2:
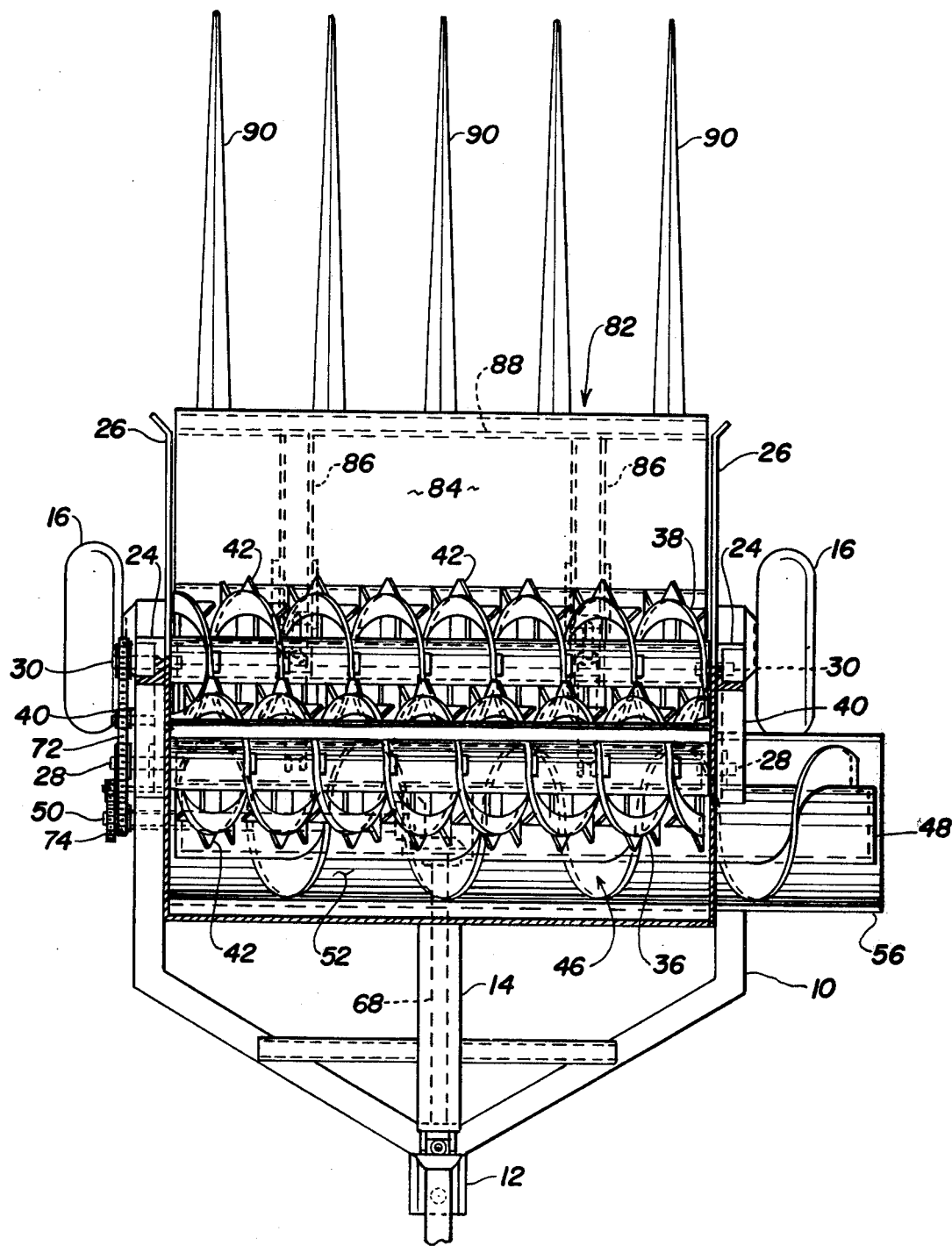
FIG. 2 is a top plan view of the machine shown in FIG. 1, partly in transverse section, as seen along the line 2—2 of FIG. 1, and showing the bale elevating member in the lower position as illustrated in FIG. 1.

Mounted in the lower rearward portion of the housing 18 is a discharge auger 46 which has appropriate spiral flights extending around a tubular core 48 to which a shaft 50 (see FIG. 2) is connected, said shaft extending through a suitable bearing in one side of the housing 18. The flight of the auger 46 is surrounded on the rearward and the lower confines thereof by a transversely extending arcuate shell 52. Said shell extends between the side plates 26 of the housing and is fixed thereto and one of said plates has an opening 54 shaped as shown in FIG. 1, through which one end of the auger projects, as shown in FIG. 2, and the outer end 56 of said shell is shaped as shown in FIG. 1, corresponding to the opening 54. However, the portion of the shell which extends between the side plates 26 of the housing has a rear, vertical portion which extends downwardly and around the lower portion of the flights of the auger 46 but the edge portion thereof which is farthest from the back wall of the housing 18 comprises a partial floor member 58 which is rigid and slopes upwardly and forwardly as shown in FIG. 1, the outer edge thereof having a hinge pin 60 to which one edge of an auxiliary planar floor member 62 is hingedly connected. By such arrangement, the shell 52 and especially the partial floor member 58 thereof provide ready means within the housing 18 to receive shredded material which is effected by rotation of the shredding members 36 and 38, by means to be described hereinafter.

The driving means for the machine comprises a right-angle gear box 64 which is connected to the inner end of the p.t.o. connector 14 and is supported by a transverse frame member 66 as shown in FIGS. 3 and 4. Said gear box is driven by the drive shaft 68 which extends rearwardly from the p.t.o. connection from the tractor and a lateral shaft 70 extends outwardly therefrom and projects beyond the side of the machine as shown in FIG. 4. The drive for the various rotatable members including the shredding members 36 and 38 and the discharge auger 46 comprises a plurality of sprocket chains 72 and 74. The chain 72 is the longer of the two and extends around a sprocket on one end of shaft 30, another sprocket on shaft 28 and another sprocket fixed to shaft 50 in tandem with an additional sprocket on said shaft 50. The chain 74 extends around said additional sprocket on shaft 50 and also a sprocket on the outer end of shaft 70. The chain 74 has an adjustable tightening sprocket 76, best shown in FIGS. 1 and 4, and chain 72 has another adjustable tightening sprocket 78 shown best in FIGS. 1 and 4. It is to be understood that these tightening sprockets 76 and 78 are of conventional type adjustably supported relative to the side plate of the housing of the machine. In the preferred embodiment a knock-down bar 80, as shown in FIG. 1, extending between the opposite sides of the housing 18, above the uppermost shredding member 38, is provided to prevent unintentional escape of shredded material from the machine as the roll type bale 43 is disintegrated by the action of the shredding members 36 and 38 and especially the upper shredding member 38. The bar 80 deflects the material downwardly into the upper shredding member 38 and also prevents large bunches of material from wedging between member 38 and housing plate 22.

One of the very important features of the present invention comprises the planar elevating member 82 which comprises a smooth, nonperforated plate 84 having a width substantially equal to the distance between opposite sides of the housing 18, as shown best in FIG. 2 but also as shown in FIGS. 3 and 4. Said plate is unitary and is connected to a pair of supporting beams 86 which extend along the under surface of plate 84 and are spaced transversely apart as well as being spaced limited distances inwardly from the lateral edges of the plate 84 as clearly shown in FIG. 2. Preferably, the beams 86 are in the form of inverted channels 86, or a square or rectangular tube, which are welded to the under surface of plate 84. Extending between the lower ends of the beams 86 and rigidly connected thereto is a transverse beam member 88 which preferably is in the form of a square tube to which the inner ends of a plurality of fork tines 90 are firmly connected such as by welding. Said tines are of appreciable length as seen from FIG. 1 and taper from the inner ends to the outer ends thereof, whereby the relatively pointed outer ends readily project beneath the roll type bale 43 as the machine is moved forwardly into contact with such a bale.

The inner ends of the beams 86 are provided with bearings to receive a transverse shaft 92 which extends between the opposite side plates 26 of the housing 18 for support. The planar elevating member 82 moves between a lower position shown in full lines in FIG. 1, in which the tines 90 thereof project beneath a roll type bale 43, and an uppermost position shown in phantom in FIG. 1. These are the two extreme positions of the elevating member and it will be seen that the supporting beams 86 and plate 84 move through an arc of approximately 90° between said two extreme positions, as readily can be seen from FIG. 1. Also, when in the lower, loading position, the plate 84 of the elevating member 82 extends downward and forwardly from the shaft 92, which is directly below the shredding member 36 and, in the uppermost elevated position, the plate 84 of elevating member 82 extends rearward and downward toward the transverse shaft 92 so as to effectively support the bale 43 firmly against the shredding members 36 and 38 and the slope of the plate 84 in the uppermost position feeds the bale against said shredding members by gravity. It will be seen also in the phantom position that the tines 90 are substantially vertical, in line with the forward open face of the housing 18.

The planar elevating member 82 is raised and lowered by fluid-operated cylinder members 94. One end of each cylinder member is suitably supported pivotally upon a fixed axis 96, see FIG. 1, which extends transversely between opposite sides of the frame 10. One cylinder member 94 is aligned with each of the pair of beams 86 beneath the plate 84 of the elevating member 82 and the outer end of the piston rod 98 of each cylinder member 94 extends between a pair of gussets 100, as clearly shown in FIG. 4. Thus, it will be seen that the upper surface of the plate 84 of the elevating member 82 not only is planar, smooth and imperforate, but the power means comprising the cylinder members 94 is entirely beneath the lower surface of the plate 84 so as not to impede any movement of the material being shredded.

Still another important feature of the present invention comprises the function of the stationary partial floor member 58 which slopes upwardly and forwardly and the auxiliary floor member 62 which is hingedly connected to the outer end of the partial floor member 58. As viewed in FIG. 1, it will be seen that the auxiliary floor member 62 extends downwardly from the pivot 60 by gravity and the outer end thereof slidably engages the upper smooth surface of the plate 84 of elevating member 82. However, in all positions of operation, the upper surface of auxiliary floor member 62 is at a substantial obtuse angle to the upper surface of the plate 84, regardless of whether the plate 84 is in the lowermost full line position shown in FIG. 1 or the uppermost phantom position shown in said figure. Further, when in said uppermost position, it will be seen in the phantom illustration thereof that the auxiliary floor member 62 is nearly in the same plane as the plate 84. Also, it is apparent from FIG. 1 that when in said uppermost position, the plate 84, auxiliary floor member 62 and partial floor member 58 are substantially within a common plane that slopes smoothly downwardly and inwardly from the front end of the housing 18 so as to assure positive and smooth movement of the bale 43 by gravity downwardly into effective and aggressive engagement with the shredding teeth 42 as well as other portions of the shredding members 36 and 38. When the material shredded from the bale 43 is separated therefrom, it will be carried by the shredding members 36 and 38 in a somewhat circular path toward the rearward portion of the housing 18 and in alignment with the arcuate shell 52 associated with the auger 46, the auger being driven in a direction to enable the flights thereof to positively move the shredded material to the outer discharge end 56 of the shell 42 as can appropriately be visualized from FIG. 2.

The operation of the cylinder members 94 is effected by appropriate valve means, not shown, either manually or automatically operated upon engagement of the tines 90 beneath a bale 43 for purposes of elevating the bale into engagement with the shredding members 36 and 38 and maintaining it in such engagement. When initially elevated, depending upon the diameter of the bale 43, it may be that the elevating member 82 cannot be moved directly to its uppermost position but such a position is attained following a certain amount of disintegration and shredding of the bale 43 to reduce the diameter thereof.

From the foregoing, it will be seen that the present invention provides in particular cooperating members comprising partial floor member 58, auxiliary floor member 62 and plate 84 of elevating member 82 which respectively extend completely between the opposite side plates 26 of the housing 18 and in all positions of operation of said members, there is no possibility of unintentional escape of shredded material from any part of the machine except the projecting outer end 56 of shell 52 associated with the auger 46. In addition, and very importantly, when the elevating member 82 is either in or approaches its uppermost position, the cooperating members 58, 62 and 84 present a smooth, imperforate, downwardly and inwardly sloping surface to guide the shredded material to the auger 46 and such sloping configuration also tends to wedge the bale by gravity against the shredding members 36 and 38.

The foregoing description illustrates preferred embodiments of the invention. However, the concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. In a machine for processing forage material packages such as roll type bales including:
 a mobile frame having opposite sides, a front end and a back end;
 elevating means on said frame to engage and elevate a forage package, said elevating means including an elevating member movable on the front end of said frame and extending between the opposite sides of said frame;
 rotatable shredding means supported by said frame in a position to engage the forage material package when said package is raised by said elevating means into contact therewith;
 means pivotally connecting one end of said elevating member to said frame below the shredding means;

means interconnecting said frame and said elevating member operable to raise and lower said member such that said elevating member is movable between a lower downwardly and forwardly extending position and an upper rearwardly and downwardly extending position, thereby defining its extreme limits of movement, so that when said elevating member is raised to said upper rearwardly and downwardly position gravity forces said forage material package toward said shredding means;

delivery means positioned on said frame to receive the shredded material from said shredding means for discharge of the same from the machine, said delivery means including a rotatable auger and a shell extending around the lower portion of said auger; and means for driving said shredding means and said delivery means, the improvement in said delivery means comprising:

a plate-like partial floor member having a first end and a second end and a plate-like auxiliary floor member positioned adjacent one another pivotally connected to each other along a pivot axis and extending transversely of said frame substantially between the opposite sides thereof and supported therebetween, said partial floor member sloping upwardly and forwardly away from shell, said auxiliary floor member being pivotable from a position generally below said first end to a position generally above said first end and said pivot axis, said pivot axis positioned in a horizontal plane spaced above a horizontal plane through said means pivotally connecting one end of said elevating member to said frame so that said auxiliary floor member continuously slidably engages said elevating member as it moves between its extreme limits to prevent material from escaping unintentionally from the machine.

2. The machine according to claim 1 in which when said elevating member is in the uppermost position thereof said auxiliary floor member is substantially within the plane of said partial floor member to which it is connected pivotally and the upper surface of said auxiliary floor member is at a substantially obtuse angle to said elevating member, whereby an overall inward and downwardly extending supporting surface is provided to feed a forage package by gravity against said shredding means.

* * * * *